United States Patent [19]
Hendel et al.

[11] Patent Number: 6,014,380
[45] Date of Patent: Jan. 11, 2000

[54] MECHANISM FOR PACKET FIELD REPLACEMENT IN A MULTI-LAYER DISTRIBUTED NETWORK ELEMENT

[75] Inventors: Ariel Hendel, Cupertino; Shimon Muller, Sunnyvale; Louise Yeung, San Carlos, all of Calif.

[73] Assignee: Sun Microsystems, Inc., Mountain View, Calif.

[21] Appl. No.: 08/885,257

[22] Filed: Jun. 30, 1997

[51] Int. Cl.⁷ .................................................. H04L 12/56
[52] U.S. Cl. ........................... 370/392; 370/401; 370/469
[58] Field of Search .......................... 370/400, 401–403, 370/406, 408, 254, 255, 392, 389, 256, 410, 522, 469; 395/200.68, 200.75, 200.33; 371/37.7; 714/807

[56] References Cited

U.S. PATENT DOCUMENTS

| | | | |
|---|---|---|---|
| 4,652,874 | 3/1987 | Loyer | 340/825.05 |
| 4,807,111 | 2/1989 | Cohen et al. | 364/200 |
| 4,850,042 | 7/1989 | Petronio et al. | 455/606 |
| 4,899,333 | 2/1990 | Roediger | 370/427 |
| 4,922,503 | 5/1990 | Leone | 370/85.13 |
| 4,933,938 | 6/1990 | Sheehy | 370/85.13 |
| 5,150,358 | 9/1992 | Punj et al. | 370/468 |
| 5,210,746 | 5/1993 | Maher et al. | 370/79 |
| 5,220,562 | 6/1993 | Takada et al. | 370/401 |
| 5,231,633 | 7/1993 | Hluchyj et al. | 370/94.1 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/725 |
| 5,309,437 | 5/1994 | Perlman et al. | 340/827 |
| 5,343,471 | 8/1994 | Cassagnol | 370/85.13 |
| 5,386,413 | 1/1995 | McAuley et al. | 370/54 |
| 5,392,432 | 2/1995 | Engelstad et al. | 395/700 |
| 5,394,402 | 2/1995 | Ross | 370/401 |
| 5,410,540 | 4/1995 | Aiki et al. | 370/390 |
| 5,410,722 | 4/1995 | Cornaby | 395/800 |
| 5,422,838 | 6/1995 | Lin | 365/49 |
| 5,425,028 | 6/1995 | Britton et al. | 370/94.1 |
| 5,426,736 | 6/1995 | Guineau, III | 395/250 |
| 5,450,399 | 9/1995 | Sugita | 370/60.1 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,611 | 10/1995 | Drake, Jr. et al. | 370/54 |
| 5,461,624 | 10/1995 | Mazzola | 370/402 |
| 5,473,607 | 12/1995 | Hausman | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/255 |

(List continued on next page.)

FOREIGN PATENT DOCUMENTS 13016   6/1998   WIPO .

OTHER PUBLICATIONS

International Search Report, PCT/US98/13368, 5 pages.
International Search Report, PCT/US98/13364, 4 pages.
International Search Report, PCT/US98/13365, 4 pages.

(List continued on next page.)

*Primary Examiner*—Chau T. Nguyen
*Attorney, Agent, or Firm*—Blakely Sokoloff Taylor & Zafman

[57] ABSTRACT

A multi-layer distributed network element for relaying packets according to known routing protocols. A distributed architecture of multiple subsystems delivers routing at wire-speed performance across subnetworks. Each subsystem includes a forwarding memory and an associated memory and is configured to identify unicast and multicast packets for routing purposes, modify the packets in hardware, including replace VLAN information, and forward the packets to the next hop. The routing decisions are made in the inbound subsystem, and packets and associated control information are forwarded, if necessary given the network topology, through a separate outbound subsystem. When packets traverse the internal links from one subsystem to another, encapsulation operations are conducted such as appending an additional cyclic redundancy code (CRC) to the packet before going through the internal link.

21 Claims, 8 Drawing Sheets

U.S. PATENT DOCUMENTS

| | | | |
|---|---|---|---|
| 5,485,578 | 1/1996 | Sweazey | 395/200.54 |
| 5,490,139 | 2/1996 | Baker et al. | 370/60 |
| 5,490,252 | 2/1996 | Macera et al. | 395/200.01 |
| 5,500,860 | 3/1996 | Perlman et al. | 370/85.13 |
| 5,515,376 | 5/1996 | Murthy et al. | 340/402 |
| 5,535,202 | 7/1996 | Kondoh | 370/60.1 |
| 5,555,405 | 9/1996 | Griesmaer et al. | 395/600 |
| 5,561,666 | 10/1996 | Christensen et al. | 370/434 |
| 5,570,365 | 10/1996 | Yodhida | 370/85.6 |
| 5,572,522 | 11/1996 | Calamvokis et al. | 370/395 |
| 5,583,981 | 12/1996 | Pleyer | 395/326 |
| 5,594,727 | 1/1997 | Kolbenson et al. | 370/468 |
| 5,600,641 | 2/1997 | Duault et al. | 370/400 |
| 5,602,841 | 2/1997 | Lebizay et al. | 370/413 |
| 5,610,905 | 3/1997 | Murthy et al. | 370/401 |
| 5,619,500 | 4/1997 | Hiekali | 370/414 |
| 5,619,661 | 4/1997 | Crews et al. | 395/299 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,741 | 10/1997 | Aggarwal et al. | 370/200.12 |
| 5,684,800 | 11/1997 | Dobbins et al. | 370/401 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,358 | 3/1998 | Headrick et al. | 370/418 |
| 5,726,977 | 3/1998 | Lee | 370/235 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/422 |
| 5,740,375 | 4/1998 | Dunne et al. | 395/200.68 |
| 5,742,604 | 4/1998 | Edsall | 370/401 |
| 5,742,760 | 4/1998 | Picazo, Jr. et al. | 370/351 |
| 5,745,048 | 4/1998 | Taguchi et al. | 340/870.01 |
| 5,748,905 | 5/1998 | Hauser et al. | 395/200.79 |
| 5,751,967 | 5/1998 | Raab et al. | 395/200.58 |
| 5,754,540 | 5/1998 | Liu et al. | 370/315 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,764,634 | 6/1998 | Christensen et al. | 370/401 |
| 5,764,636 | 6/1998 | Edsall | 370/401 |
| 5,781,549 | 7/1998 | Dai | 370/398 |
| 5,784,573 | 7/1998 | Szczepanek et al. | 395/200.8 |
| 5,790,546 | 8/1998 | Dobbins et al. | 370/400 |
| 5,802,052 | 9/1998 | Venkataraman | 370/395 |

OTHER PUBLICATIONS

International Search Report, PCT/US98/13177, 4 pages.
International Search Report, PCT/US98/13199, 5 pages.
International Search Report, PCT/US98/13015, 5 pages.
Agrawal et al., A Scalable Shared Buffer ATM Switch Architecture, VLSI, 1995 5th Great Lakes Symposium, IEEE, p. 256–261, 1994.
Sabaa et al., Implementation of a Window–Based Scheduler in an ATM Switch, Electrical and Computer Engineering, 1995 Canadian Conference, IEEE, p. 32–35, 1995.
Naraghi–Pour et al., A Multiple Shared Memory Switch, System Theory, 1996 Southeastern Symposium, IEEE, p. 50–541996.
Iyengar et al., Switching Prioritized Packets, GLOBECOM '89: IEEE Global Telecommunications Conference, p. 1181–1186, 1989.
Wang et al., A Novel Message Switch for Highly Parallel Systems, IEEE, p. 150–155, 1989.
Tobagi, Fast Packet SwitchArchitectures for Broadband Integrated Services Digital Networks, Proceedings of the IEEE, vol. 78, Issue 1, pp. 133–167, Jan. 1990.
Fliesser et al., Design of a Multicast ATM Packet Switch, Electrical and Computer Engineering, 1993 Canadian Conference, p. 779–783, 1993.
Chang et al., An Overview of the Pipelined Common Buffer Architecture (PCBA) for Memory Based Packet/Cell Switching Systems, Local Computer Networks, 1994, p. 288–297, 19th Conference, IEEE.
"Foundry Products", downloaded from Website http://www.foundrynet.com/ on Jun. 19, 1997.
Anthony J. McAuley & Paul Francis, "Fast Routing Table Lookup Using CAMs", IEEE, 1993, pp. 1382–1390.
"Gigabit Ethernet", Network Strategy Report, The Burton Group, v2, May 8, 1997 40 pages.
"IP On Speed", Erica Roberts, Internet–Draft, Data Communications on the Web, Mar. 1997, 12 pages.
"Multilayer Topology", White Paper, Internet–Draft, 13 pages, downloaded from Website http://www.baynetworks.com on Apr. 18, 1997.

MECHANISM FOR PACKET FIELD REPLACEMENT IN A MULTI-LAYER DISTRIBUTED NETWORK ELEMENT

BACKGROUND

1. Field of the Invention

This invention relates generally to communication systems that couple computers, and more specifically to relaying messages through a network element.

2. Description of Related Art

Communication between computers has become an important aspect of everyday life in both private and business environments. Computers converse with each other based upon a physical medium for transmitting the messages back and forth, and upon a set of rules implemented by electronic hardware attached to and programs running on the computers. These rules, often called protocols, define the orderly transmission and receipt of messages in a network of connected computers.

A local area network (LAN) is the most basic and simplest network that allows communication between a source computer and destination computer. The LAN can be envisioned as a cloud to which computers (also called endstations or end-nodes) that wish to communicate with one another are attached. At least one network element will connect with all of the endstations in the LAN. An example of a simple network element is the repeater which is a physical layer relay that forwards bits. The repeater may have a number of ports, each endstation being attached to one port. The repeater receives bits that may form a packet of data that contains a message from a source endstation, and blindly forwards the packet bit-by-bit. The bits are then received by all other endstations in the LAN, including the destination.

A single LAN, however, may be insufficient to meet the requirement s of an organization that has many endstations, because of the limited number of physical connections available to and the limited message handling capability of a single repeater. Thus, because of these physical limitations, the repeater-based approach can support only a limited number of endstations over a limited geographical area.

The capability of computer networks, however, has been extended by connecting different subnetworks to form larger networks that contain thousands of endstations communicating with each other. These LANs can in turn be connected to each other to create even larger enterprise networks, including wide area network (WAN) links.

To facilitate communication between subnetworks in a larger network, more complex electronic hardware and software have been proposed and are currently used in conventional networks. Also, new sets of rules for reliable and orderly communication among those endstations have been defined by various standards based on the principle that the endstations interconnected by suitable network elements define a network hierarchy, where endstations within the same subnetwork have a common classification. A network is thus said to have a topology which defines the features and hierarchical position of nodes and endstations within the network.

The interconnection of endstations through packet switched networks has traditionally followed a peer-to-peer layered architectural abstraction. In such a model, a given layer in a source computer communicates with the same layer of a peer endstation (usually the destination) across the network. By attaching a header to the data unit received from a higher layer, a layer provides services to enable the operation of the layer above it. A received packet will typically have several headers that were added to the original payload by the different layers operating at the source.

There are several layer partitioning schemes in the prior art, such as the Arpanet and the Open Systems Interconnect (OSI) models. The seven layer OSI model used here to describe the invention is a convenient model for mapping the functionality and detailed implementations of other models. Aspects of the Arpanet, however, (now redefined by the Internet Engineering Task Force, or IETF) will also be used in specific implementations of the invention to be discussed below.

The relevant layers for background purposes here are Layer 1 (physical), Layer 2 (data link), and Layer 3 (network), and to a limited extent Layer 4 (transport). A brief summary of the functions associated with these layers follows.

The physical layer transmits unstructured bits of information across a communication link. The repeater is an example of a network element that operates in this layer. The physical layer concerns itself with such issues as the size and shape of connectors, conversion of bits to electrical signals, and bit-level synchronization.

Layer 2 provides for transmission of frames of data and error detection. More importantly, the data link layer as referred to in this invention is typically designed to "bridge," or carry a packet of information across a single hop, i.e., a hop being the journey taken by a packet in going from one node to another. By spending only minimal time processing a received packet before sending the packet to its next destination, the data link layer can forward a packet much faster than the layers above it, which are discussed next. The data link layer provides addressing that may be used to identify a source and a destination between any computers interconnected at or below the data link layer. Examples of Layer 2 bridging protocols include those defined in IEEE 802 such as CSMA/CD, token bus, and token ring (including Fiber Distributed Data Interface, or FDDI).

Similar to Layer 2, Layer 3 also includes the ability to provide addresses of computers that communicate with each other. The network layer, however, also works with topological information about the network hierarchy. The network layer may also be configured to "route" a packet from the source to a destination using the shortest path. Finally, the network layer can control congestion by simply dropping selected packets, which the source might recognize as a request to reduce the packet rate.

Finally, Layer 4, the transport layer, provides an application program such as an electronic mail program with a "port address" which the application can use to interface with Layer 3. A key difference between the transport layer and the lower layers is that a program on the source computer carries a conversation with a similar program on the destination computer, whereas in the lower layers, the protocols are between each computer and its immediate neighbors in the network, where the ultimate source and destination endstations may be separated by a number of intermediate nodes. Examples of Layer 4 and Layer 3 protocols include the Internet suite of protocols such as TCP (Transmission Control Protocol) and IP (Internet Protocol).

Endstations are the source and ultimate destination of a packet, whereas a node refers to an intermediate point between the endstations. A node will typically include a network element which has the capability to receive and forward messages on a packet-by-packet basis.

Generally speaking, the larger and more complex networks typically rely on nodes that have higher layer (Layers 3 and 4) functionalities. A very large network consisting of several smaller subnetworks must typically use a Layer 3 network element known as a router which has knowledge of the topology of the subnetworks.

A router can form and store a topological map of the network around it based upon exchanging information with its neighbors. If a LAN is designed with Layer 3 addressing capability, then routers can be used to forward packets between LANs by taking advantage of the hierarchical routing information available from the endstations. Once a table of endstation addresses and routes has been compiled by the router, packets received by the router can be forwarded after comparing the packet's Layer 3 destination address to an existing and matching entry in the memory.

The router operates by parsing the header of a received packet, making decisions based on a routing table inside the router, and forwarding the packet, with any required header modifications, to the next node or endstation. Thus, the packet will go through several such "hops" before reaching its destination where a hop is defined as the packet traveling from one node or endstation to another node or endstation.

In comparison to routers, bridges are network elements operating in the data link layer (Layer 2) rather than Layer 3. They have the ability to forward a packet based only on the Layer 2 address of the packet's destination, typically called the medium access control (MAC) address. Generally speaking, bridges do not modify the packets. Bridges forward packets in a flat network having no hierarchy without any cooperation from the endstations.

Hybrid forms of network elements also exist, such as brouters and switches. A brouter is a router which can also perform as a bridge. The term switch refers to a network element which is capable of forwarding packets at high speed with functions implemented in hardwired logic as opposed to a general purpose processor executing instructions. Switches come in many flavors, operating at both Layer 2 and Layer 3.

Having discussed the current technology of networking in general, the limitations of such conventional techniques will now be addressed. With an increasing number of users requiring increased bandwidth from existing networks due to multimedia applications to run on the modern day Internet, modern and future networks must be able to support a very high bandwidth and a large number of users. Furthermore, such networks should be able to support multiple traffic types such as voice and video which typically require different service characteristics. Statistical studies show that the network domain, i.e., a group of interconnected LANs, as well as the number of individual endstations connected to each LAN, will grow at a faster rate in the future. Thus, more network bandwidth and more efficient use of resources is needed to meet these requirements.

Building networks using Layer 2 elements such as bridges provides fast packet forwarding between LANs but has no flexibility in traffic isolation, redundant topologies, and end-to-end policies for queuing and access control. Endstations in a subnetwork can invoke conversations based on either Layer 3 or Layer 2 addressing. As bridges forward packets based on only Layer 2 parsing, the provide simple yet speedy forwarding services. However, the bridge does not support the use of high layer handling directives including queuing, priority, and forwarding constraints between endstations in the same subnetwork.

A prior art solution to enhancing bridge-like conversations within a subnetwork relies on a network element that uses a combination of Layer 2 and upper layer headers. In that system, the Layer 3 and Layer 4 information of an initial packet are examined, and a "flow" of packets is predicted and identified using a new Layer 2 entry in the forwarding memory, with a fixed quality of service (QOS). Thereafter, subsequent packets are forwarded at Layer 2 speed (with the fixed QOS) based upon a match of the Layer 2 header with the Layer 2 entry in the forwarding memory. Thus, no entries with Layer 3 and Layer 4 headers are placed in the forwarding memory to identify the flow.

However, consider the scenario where there are two or more programs communicating between the same pair of endstations, such as an electronic mail program and a video conferencing session. If the programs have dissimilar QOS needs, the prior art scheme just presented will not support different QOS characteristics between the same pair of endstations, because the prior art scheme does not consider information in Layer 3 and Layer 4 when forwarding. Thus, there is a need for a network element that is flexible enough to support independent priority requests from applications running on endstations connected to the same subnetwork.

The latter attributes may be met using Layer 3 elements such as routers. But packet forwarding speed is sacrificed in return for the greater intelligence and decision making capability provided by the router. Therefore, networks are often built using a combination of Layer 2 and Layer 3 elements.

The role of the server has multiplied with browser-based applications that use the Internet, thus leading to increasing variation in traffic distribution. When the role of the server was narrowly limited to a file server, for example, the network was designed with the client and the file server in the same subnetwork to avoid router bottlenecks. However, more specialized servers like World Wide Web and video servers are typically not on the client's subnetwork, such that crossing routers is unavoidable. Therefore, the need for packets to traverse routers at higher speeds is crucial. The choice of bridge versus router typically results in a significant trade-off, lower functionality when using bridges, and lower speed when using routers. Furthermore, the service characteristics within a network are no longer homogenous, as the performance of a server becomes location dependent if its traffic patterns involve routers.

Therefore, there is a need for a network element that can handle changing network conditions such as topology and message traffic yet make efficient use of high performance hardware to switch packets based on their Layer 2, Layer 3, and Layer 4 headers. The network element should be able to operate at bridge-like speeds, yet be capable of routing packets across different subnetworks and provide upper layer functionalities such as quality of service.

SUMMARY

The invention is an apparatus and related method for relaying packets by a multi-layer distributed network element according to known routing protocols.

The invention is directed at a multi-layer distributed network element (MLDNE) for receiving and forwarding packets using known routing protocols. The MLDNE has a number of subsystems that are coupled by internal links. Each subsystem has a forwarding memory and associated memory. The memories associate packet header information including addresses with routing information. A subsystem also includes external ports that connect with neighboring nodes and endstations, and internal ports that connect with other subsystems through the internal links.

When a packet is received by a first "inbound" subsystem, the subsystem determines whether the packet should be routed based upon a first header portion, including a Layer 2 destination address of the received packet, matching a Layer 2 address of the MLDNE. If the first header portion of the received packet matches the MLDNE address, then the first subsystem determines, using its forwarding memory, whether a route has been previously determined for a second header portion, including Layer 3 source and destination addresses, of the received packet.

If a type 2 entry in the forwarding memory matches the received packet's second header portion, then a neighbor node's Layer 2 address (found in associated memory) replaces the Layer 2 destination address of the packet. The neighbor node's address was previously stored in the associated memory as part of the routing information associated with the matching type 2 entry. In addition to Quality of Service information, the routing information in the associated memory also identifies the external ports of the inbound subsystem that connect with the neighbor node. If the neighbor node is connected to a subsystem other than the inbound subsystem, the situation would have been recognized at the time the matching type 2 entry was created such that the associated memory would identify the internal port of the inbound subsystem, rather than external port, that connects with the other subsystem to which the neighbor node or endstation is connected.

When the packet is received over the internal link by a second subsystem, the packet is forwarded to the neighbor node in response to the packet's new first header portion matching a type 1 entry in the second forwarding memory. The type 1 entry in the second subsystem contains the address of the neighbor node or endstation and had been created independently of the matching type 2 entry of the inbound subsystem.

After determining that a received packet should be routed, the inbound subsystem also generates a first control signal which indicates to the external port that eventually forwards the packet that a third header portion identifying the packet's source be modified before sending the packet to the neighbor node. A Layer 2 source address of the packet is replaced with a source address associated with the external port. The control signal is also passed over an internal link to the second subsystem if the neighbor node is reachable through that subsystem.

An innovative structure and method is disclosed for transmitting the packet and control information across the internal link. More particularly, as the inbound subsystem has determined certain information regarding the packet, for instance such as routing information, it is advantageous to simply convey this information to the outbound subsystem so that subsequent processing, such as header field replacement, can easily be performed without repeating the steps performed in the inbound subsystem. The inbound subsystem thus encapsulates the packet with control information and a cyclic redundancy code (CRC). The outbound subsystem receives the encapsulated packet, determines frame validity using the encapsulation CRC, strips the encapsulation CRC and removes the control information to determine the subsequent processing to be performed before forwarding the packet.

The invention's distributed architecture can also be configured to support routing of multicast packets. Once a multicast routable packet has been identified in the inbound subsystem, a second control signal may be sent across an internal link in response to which the second subsystem performs a type 2 search of the forwarding memory (based on the network layer and higher layer headers of the packet).

If a matching type 2 entry is found, then the external ports of the second subsystem check the first control signal (also received from the inbound subsystem) to see if the source address of the packet needs to be replaced, and the packet is then forwarded with the appropriate modifications to its headers. The first control signal may also be received and checked by the external ports of the inbound system where the multicast destination group includes nodes/endstations connected to the inbound subsystem.

The invention's search engine, forwarding engine, and data structures are organized in a way that supports bridging and routing functions simultaneously, where if routing criteria are not met for a received packet, then bridging functions are provided automatically.

In its present embodiment, the invention is implemented with the data link layer (Layer 2), the network layer (Layer 3) and higher layers including the transport layer (Layer 4).

DRAWINGS

The foregoing aspects and other features of the invention will be better understood by referring to the figures, detailed description, and claims below where:

FIG. 1 is a high level view of an exemplary network application of a multi-layer distributed network element (MLDNE) of the invention.

FIG. 2 in an internal view of the MLDNE as an embodiment of the invention.

DETAILED DESCRIPTION

Figure 1:
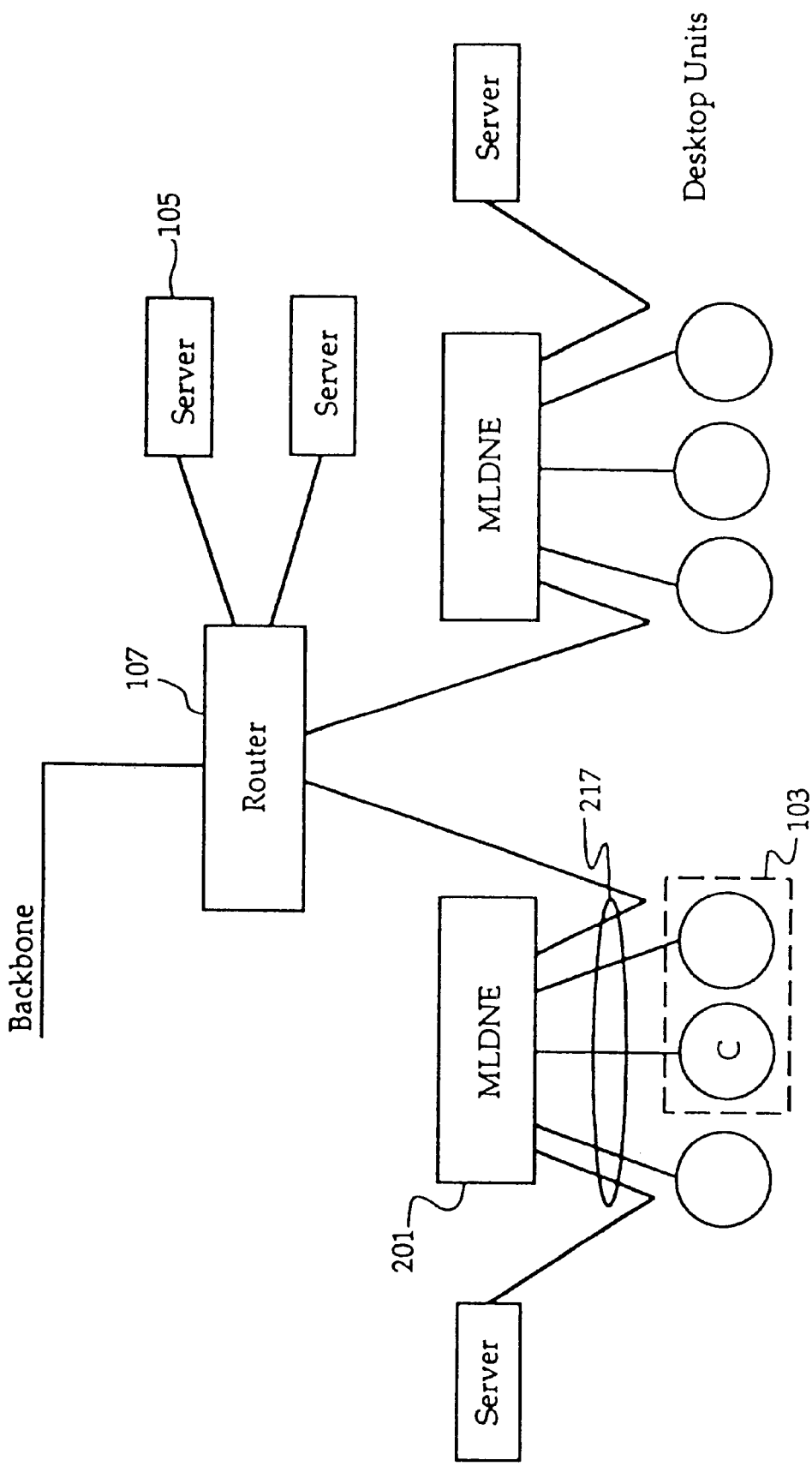

As shown in the drawings by way of illustration, the invention defines a network element that is used to interconnect a number of nodes and endstations in a variety of different ways. In particular, an application of the multi-layer distributed network element (MLDNE) would be to route packets according to predefined routing protocols over a homogenous data link layer such as the IEEE 802.3 standard, or Ethernet. FIG. 1 illustrates the invention's use as a router in a network where the MLDNE 201 couples a client C to the Router 107 which in turn couples with the Server 105. The MLDNE 201 can interconnect a number of desktop units (endstations), while acting as an intermediate node, through its external connections 217. The MLDNE 201 is capable of providing a high performance communication path between servers and desktop units while acting as a router, where the Server 105 and the client C reside in different LANs.

The MLDNE's distributed architecture can be configured to route message traffic in accordance with a number of known routing algorithms such as RIP and OSPF. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. The TCP is also referred to here as an exemplary Layer 4 protocol, while the IP is referred to repeatedly as a Layer 3 protocol. However, other protocols can be used to implement the concepts of the invention.

In a first embodiment of the invention's MLDNE, a network element is configured to implement packet routing functions in a distributed manner, i.e., different parts of a function are performed by identical building block subsystems in the MLDNE, while the final result of the functions remains transparent to the external nodes and endstations. As will be appreciated from the discussion below and the diagram in FIG. 2, the MLDNE has a scalable architecture which allows the designer to increase the number of external connections by adding additional subsystems.

Figure 2:
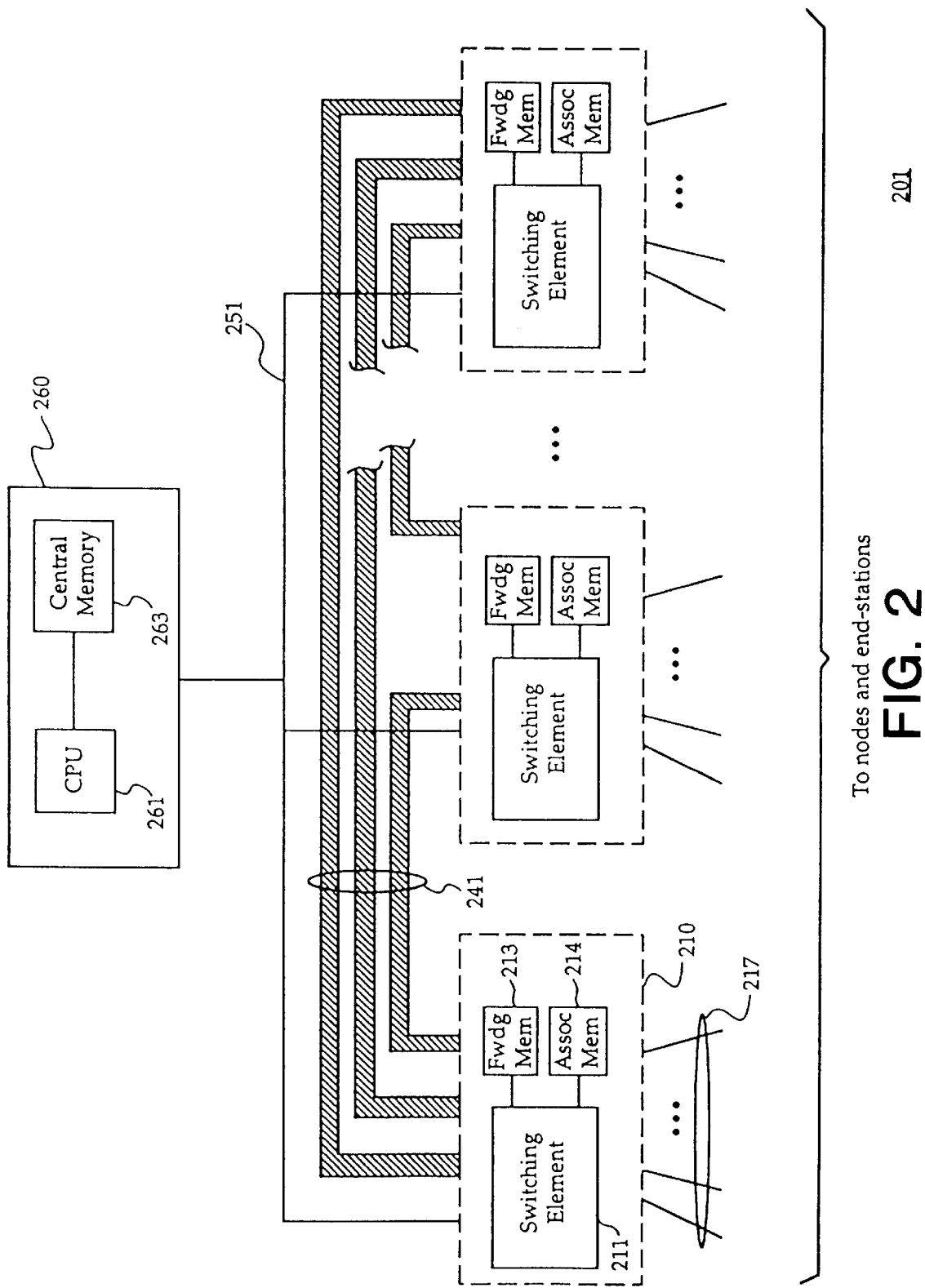

As illustrated in block diagram form in FIG. 2, the MLDNE 201 contains a number of identical subsystems 210 that are fully meshed and interconnected using a number of internal links 241 to create a larger network element. At least one internal link couples any two subsystems. Each subsystem 210 includes a forwarding memory 213 and an associated memory 214. The forwarding memory 213 stores an address table used for matching with the headers of received packets. The associated memory stores data associated with each entry in the forwarding memory that is used to identify forwarding attributes for forwarding the packets through the MLDNE. A number of external ports (not shown) having input and output capability interface the external connections 217. Internal ports (not shown) also having input and output capability in each subsystem couple the internal links 241. In the preferred embodiment, the external and internal ports lie within a hardwired-logic switching element 211 implemented by an application specific integrated circuit (ASIC).

A received packet arrives at an inbound subsystem through one of the external connections 217, and will be forwarded to a node or endstation outside the MLDNE through another external connection in an outbound subsystem. The outbound and inbound subsystems can be either the same or different subsystems.

Referring to FIG. 2, the MLDNE 201 includes a central processing system (CPS) 260 that is coupled to the individual subsystems 210 through a communication bus 251 such as the Peripheral Components Interconnect (PCI). The CPS 260 includes a central processing unit (CPU) 261 coupled to a central memory 263. Central memory 263 includes a copy of the entries contained in the individual forwarding memories 213 of the various subsystems. The CPS has a direct control and communication interface to each subsystem 210. The CPS is also configured with a number of routing protocols that are used to identify a neighbor node as part of a route for forwarding a received packet to its ultimate destination, normally specified in the Layer 3 destination address of the packet. Other responsibilities of the CPS 260 include setting data path resources such as packet buffers between the different subsystems. Finally, the CPS 260 performs the important task of determining whether or not a type 2 entry should be added to the forwarding memory of each individual subsystem.

Figure 3:
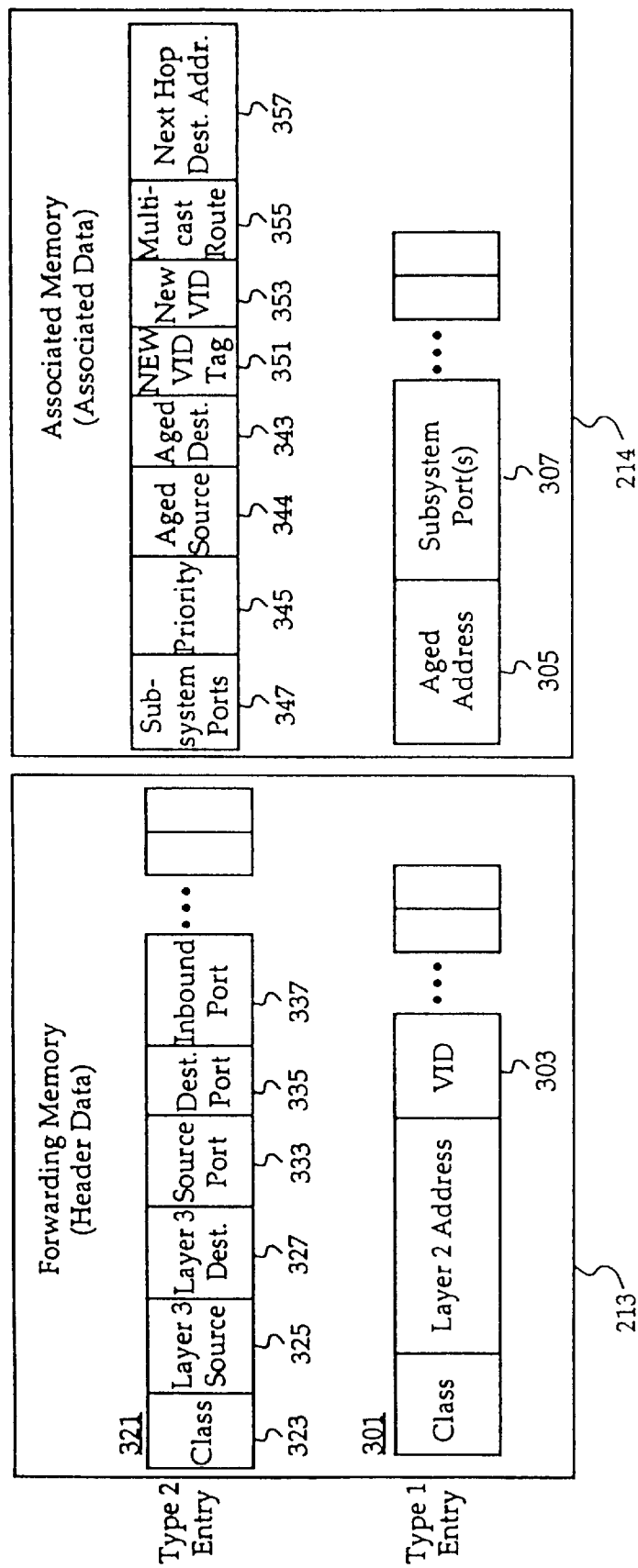
FIG. 3 illustrates an exemplary forwarding and associated memory of a subsystem in the MLDNE, including associated data for the routing of packets, according to another embodiment of the invention.

FIG. 3 takes a closer look at the forwarding and associated memories in each subsystem. The forwarding memory includes a number of entries of two types, type 2 entry 321 and type 1 entry 301. Each entry in the forwarding memory includes data to be compared with the headers of received packets. For the particular embodiment of TCP/IP, the data fields for each type 2 entry 321 include a class field 323, an IP source field 325, an IP destination field 327, an application source port 333, an application destination port 335, and an Inbound Port field 337. For the type 1 entry 301, a class field, a Layer 2 address field, and a VLAN identification (VID) field are shown in the exemplary embodiment. Of course, additional header information and similar definitions using alternate network and transport layer protocols can be developed and included in each entry and used for matching the headers of received packets, as will be apparent to one skilled in the art.

Associated with each type 2 entry 321 and type 1 entry 301 are associated data stored in associated memory 214. The associated data fields contain information needed to forward a matching packet received by the subsystem. The subsystem port field 347 identifies the internal or external ports of the subsystem used for forwarding the matching packet to the neighboring node in the next hop. The next hop address field 357 identifies the neighbor node's Layer 2 address which replaces the original Layer 2 destination address of a received unicast packet to be routed. A priority field 345 is used for queuing purposes by the external port which actually sends the packet outside the MLDNE. The age fields 343 and 344 help minimize the number of entries in the forwarding memory by indicating that a recently received packet has matched the corresponding type 1 or type 2 entry.

A NEW VID address field 353 allows the MLDNE to be configured to support virtual LANs (VLANs). The associated data also includes a NEW VLAN identification (VID) TAG field, used to notify the subsystem of a need to change the packet's VID, particularly when forwarding the packet across subnetworks. The inbound subsystem in response will either insert a new tag, or replace an existing tag with the value in the NEW VID field. For example, when routing between VLANs requires the forwarded packet's tag to be different from the received packet's tag, then the NEW VID field will contain the replacement tag for the subsystem to replace before forwarding the packet.

Whenever a packet is sent across an internal link, additional control information may be made available over the internal link to the outbound subsystem receiving the packet. Such information, in addition to the sa_replace bit discussed below, includes an orig_tag bit which indicates whether or not the received packet was originally tagged with VLAN information, a mod_tag bit which indicates whether the tag was modified by the inbound subsystem, and a dont_tag bit which indicates that the received packet should not be tagged by the outbound subsystem.

Finally, the associated memory can be configured to include a multicast route field 355 which activates multicast routing capability in the subsystem as further explained below.

The routing operation of the MLDNE 201 will be described for an exemplary embodiment using the flow diagram of FIGS. 5–7 in conjunction with the exemplary network application in FIG. 4. References to fields in the forwarding and associated memories are found in FIG. 3. In the example below, the journey of a packet is traced beginning with a client C in subnetwork 103 coupled to an external connection of MLDNE 201. The client C sends a packet to server 105 which is identified in the Layer 3 destination address field of the packet's header. The packet must traverse a router 107 which is assumed to have a Layer 2 address known by the MLDNE 201.

Figure 5:
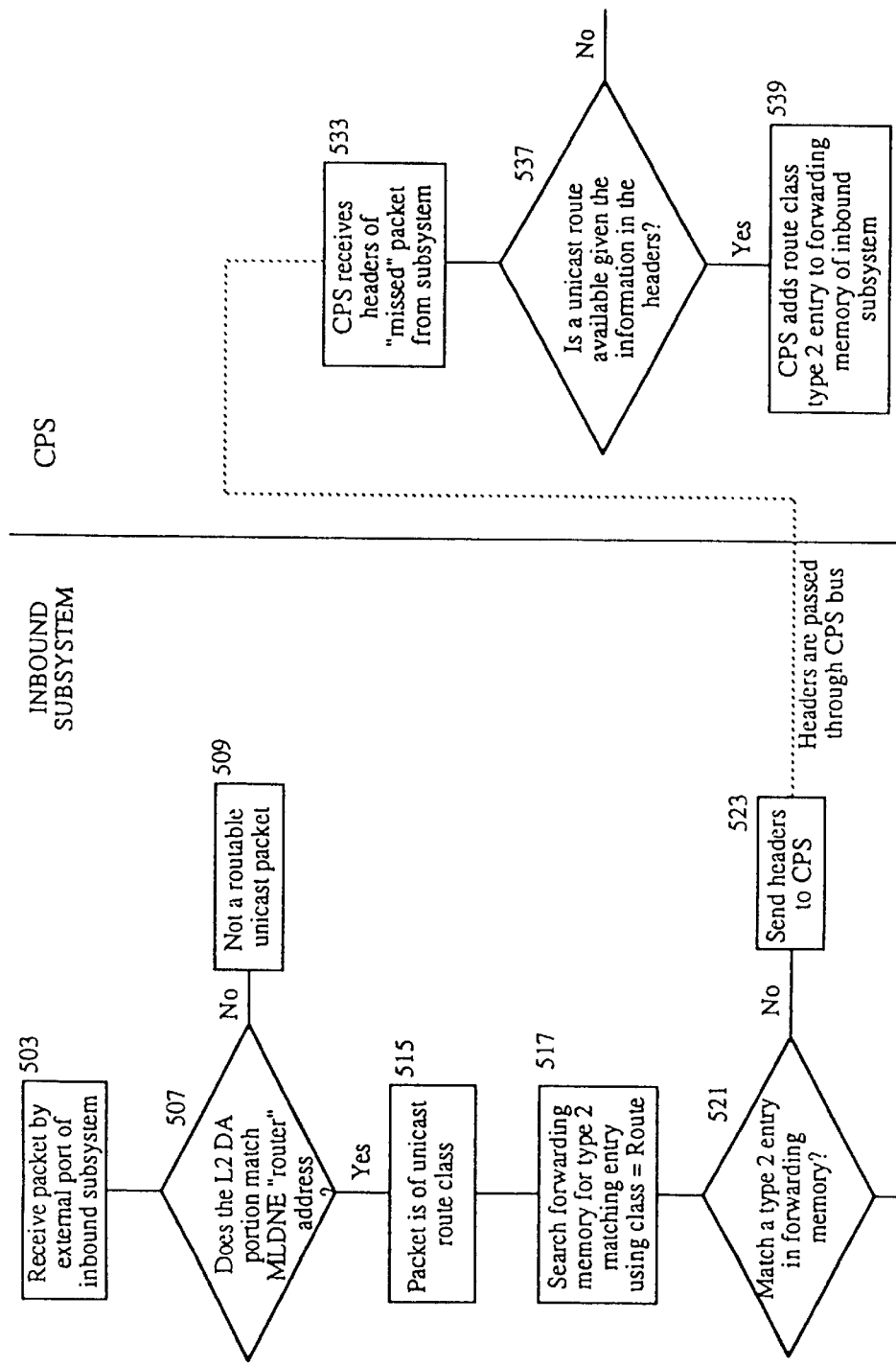
FIG. 5 is a flow diagram of processing a received packet for routing purposes by the invention's network element.

Beginning with block 503 in FIG. 5, a packet is received by the MLDNE 201 at external port $E_1$ of the inbound subsystem 410. The packet includes a message originated from a client C having a Layer 3 address in a logically defined network subnetwork 103. Subsystem 410 is configured to recognize that external ports $E_1$ and $E_2$ couple the subnetwork 103.

When the packet is received by switching element 411, operation continues with decision block 507 where first header portion, including the Layer 2 destination address in the present embodiment, of the received packet is compared with a router address of the MLDNE 201. The router address may be a Layer 2 address assigned to external port $E_1$, or a Layer 2 address assigned to the MLDNE as a whole. Normally, the MLDNE will be configured so that each external port is assigned its own router address.

If the first header portion of the received packet matches the router address, then operation proceeds to block 515 where the packet is declared to be a potential unicast route candidate. If, however, the first header portion does not match the router address, then operation proceeds to block 509 where the packet is declared as not being a unicast routable packet. As will be appreciated below, such a packet can still be a multicast packet having a multicast route available in the MLDNE.

For a unicast packet of the route class, block 517 performs a search of the forwarding memory 413 for a matching type 2 entry using "route" as the class field 323.

The search of the forwarding memory in block 517 leads to the decision block 521 where the test is whether a type 2 matching entry exists in the forwarding memory 413. If not, then operation proceeds with block 523 where relevant portions of the received packet headers are sent to the CPS via the CPS port in subsystem 410 and the CPS bus 451.

When the CPS 460 receives the portions of the headers of the "missed" packet from subsystem 410 in block 533, the CPS then examines access policies and class of service policies that have been preconfigured in the CPS, and the CPS Layer 2 and Layer 3 topology tables. The CPS has the option of denying service to the path requested by the received packet, performing the routing function entirely in its own software, or preparing a type 2 entry in the inbound system's forwarding memory for the route.

The routing algorithms of the MLDNE 201 are implemented by the CPS. If a unicast route exists or can be readily computed for the received packet, then the CPS decides in decision block 537 to proceed with block 539 and add a route class type 2 entry 321 to the forwarding memory, and associated data to the associated memory, of the inbound subsystem 410. If the neighbor node connects to an external port of the inbound subsystem 410, as determined by the CPS consulting a Layer 2 table in the central memory, then the external port is identified in the new type 2 entry's associated subsystem port field 347. Similarly, if the neighbor node connects to the subsystem 420, then an internal port $I_1$ or $I_2$ is identified.

Figure 6:
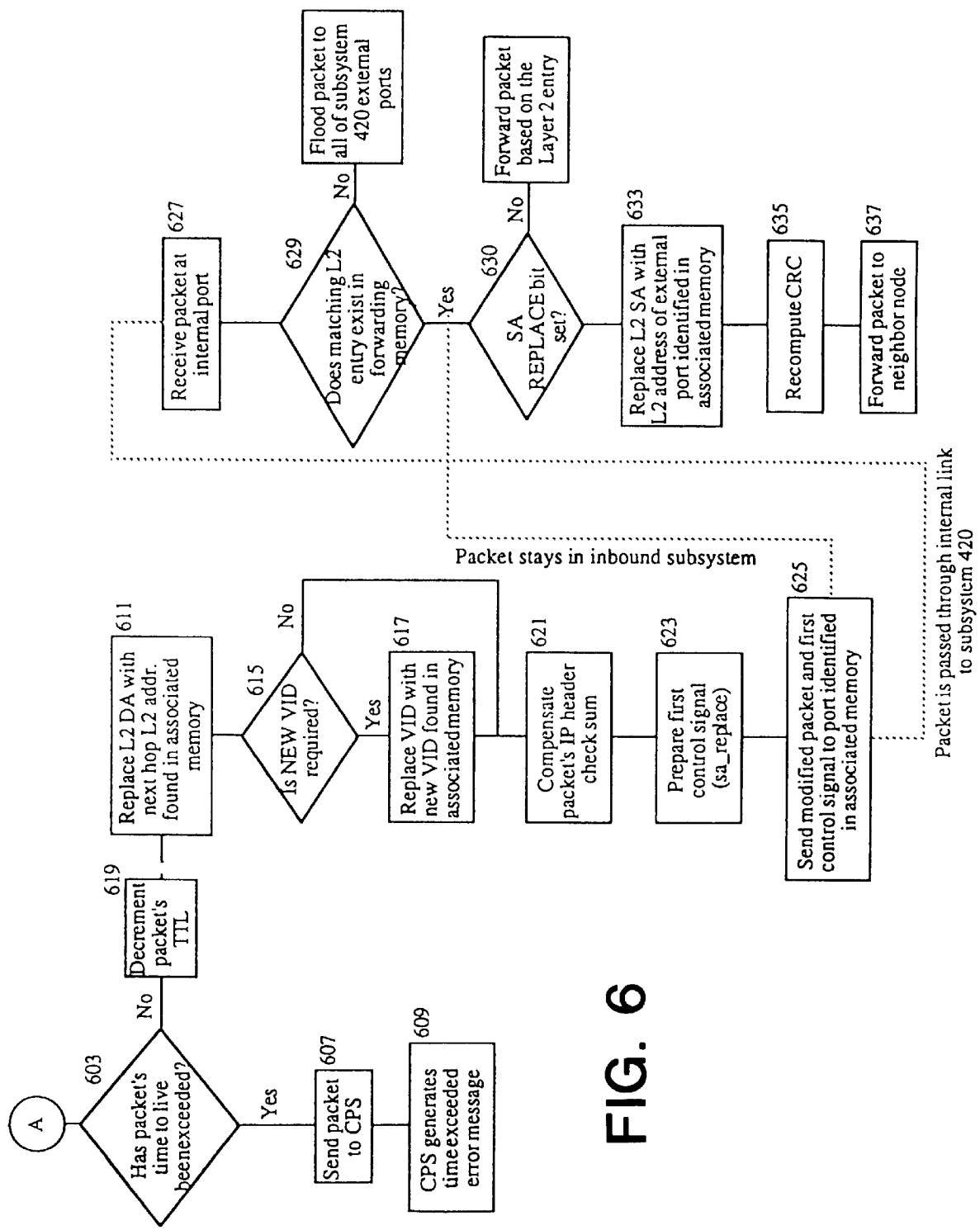
FIG. 6 is a continuation of the flow diagram in FIG. 5 and includes steps performed in processing a unicast packet.

Returning to decision block 521, if the packet matches an existing route class type 2 entry in the forwarding memory 413 of the inbound subsystem 410, then the received packet is forwarded as a unicast packet as illustrated in exemplary form in FIG. 6.

Turning now to FIG. 6 and staying in the inbound subsystem, the switching element 411 evaluates whether the unicast packet's time to live has been exceeded. A time to live field is assumed to exist in the received packet's headers. If the packet has been circulating through the network too long as indicated by its time to live field, then the inbound subsystem only sends the received packet to the CPS, and then a time exceeded error message in accordance with, for example, the Internal Control Message Protocol (ICMP) or as discussed in the Request For Comments (RFC) maintained by the Internet community, is generated by the CPS as in block 609.

If, on the other hand, the packet's time to live (TTL) has not been exceeded, then operation continues with block 619 where the TTL is decremented. This modification to the packet's header will normally require compensating the packet's Layer 3 header check sum as in block 621. In block 611, the switching element 411 replaces the Layer 2 destination address of the received packet with the next hop Layer 2 address found in the associated memory corresponding to the matching type 2 entry determined in block 521 of FIG. 5.

If the MLDNE 201 is configured to support VLANs, then decision block 615 determines whether a new VLAN identification tag is required by checking the status of the NEW VID tag field 351.

Whether or not the packet is to be forwarded outside the MLDNE by another subsystem (as indicated by the subsystem port field 347 associated with the matching type 2 entry) a first control signal, such as a sa_replace bit, is prepared in block 621. The sa_replace bit will be handed off to the external and internal ports indicated in the subsystem port field 347, and thus may be transferred over an internal link 441, together with the packet, to the subsystem 420. The first control signal will notify the subsystem (either the inbound one or another subsystem) to replace the Layer 2 source address of the packet with the source address of the external port used for forwarding the packet.

Figure 4:
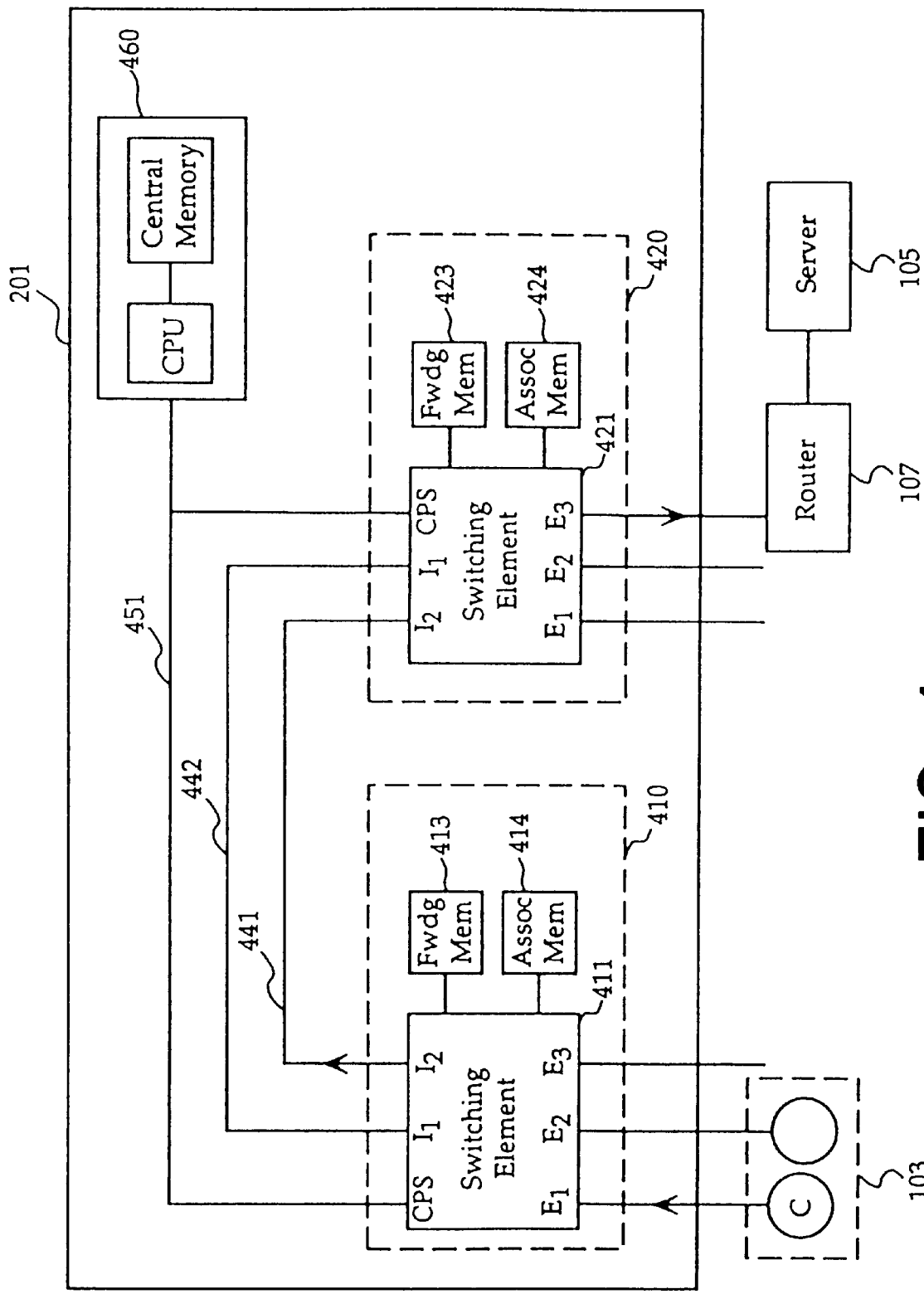
FIG. 4 is a block diagram of an embodiment of the MLDNE having only two subsystems and acting as a router between a client and a server.

In the example of FIG. 4, the packet together with any control information, including first control signal, are processed by internal port $I_2$ in switching element 411, and delivered to the internal link 441 to connect with the outbound subsystem 420 in block 627. Alternatively, however, the modified packet and control information stay in the inbound subsystem and are processed by an external port, where operation continues in block 630.

In block 627, the packet is received over the internal links in outbound subsystem 420. A type 1 matching cycle then begins and decision block 629 is reached to determine whether a matching type 1 entry exists in the forwarding memory 423. If a type 1 entry exists then operation continues with block 630.

The operation from block 630 to block 637 are performed by the "outbound" subsystem where the packet leaves the MLDNE, be it the inbound subsystem 410 or a different subsystem 420. If the sa_replace bit, as checked in decision block 630, is set, then the switching element replaces a third header portion, including at least the Layer 2 source address of the received packet, with the Layer 2 address of the external port $E_3$ through which the packet must be forwarded. The external port $E_3$ was identified in the associated data (in associated memory) corresponding to either the matching type 1 entry found in block 629 (the packet came across internal link) or the matching type 2 entry found in block 521 (the packet remained in inbound subsystem).

The MLDNE can be configured so that each external port is assigned a unique Layer 2 address. Alternatively, a single source address may be assigned to the MLDNE as a whole and shared by all external ports. In either case, following the replacement of the third header portion, the cyclic redundancy code (CRC) of the packet's headers is recomputed in block 635 and the packet is then forwarded to the neighbor node being the router 107 in FIG. 4.

In the above example, the packet's journey has been described originating from the client C and traveling through subsystem 410, internal link 441, and subsystem 420 in MLDNE 201. The packet is then received by router 107 and forwarded according to conventional means to server 105. The above, of course, assumed that a route for the server 105 as a destination through router 107 had been previously obtained by the MLDNE 201 using conventional techniques for determining the routes.

The above also covered the situation where although a unicast packet falls within the route class, no type 2 matching entry existed in the inbound subsystem to be used for routing the packet through the MLDNE. Thus, the decision as to whether or not a received packet will be routed is made in the inbound subsystem, in particular, in decision blocks 507 and 521 of FIG. 5. Note also that routing policies as well as class of service queuing have the granularity and flexibility of Layer 3 end-to-end addresses and protocol based classification. These routing policies and class of service queuing are identified in the associated data corresponding to each matching type 2 entry, and may be sent across the internal link to a separate outbound subsystem.

Multicast Routing

Figure 7:
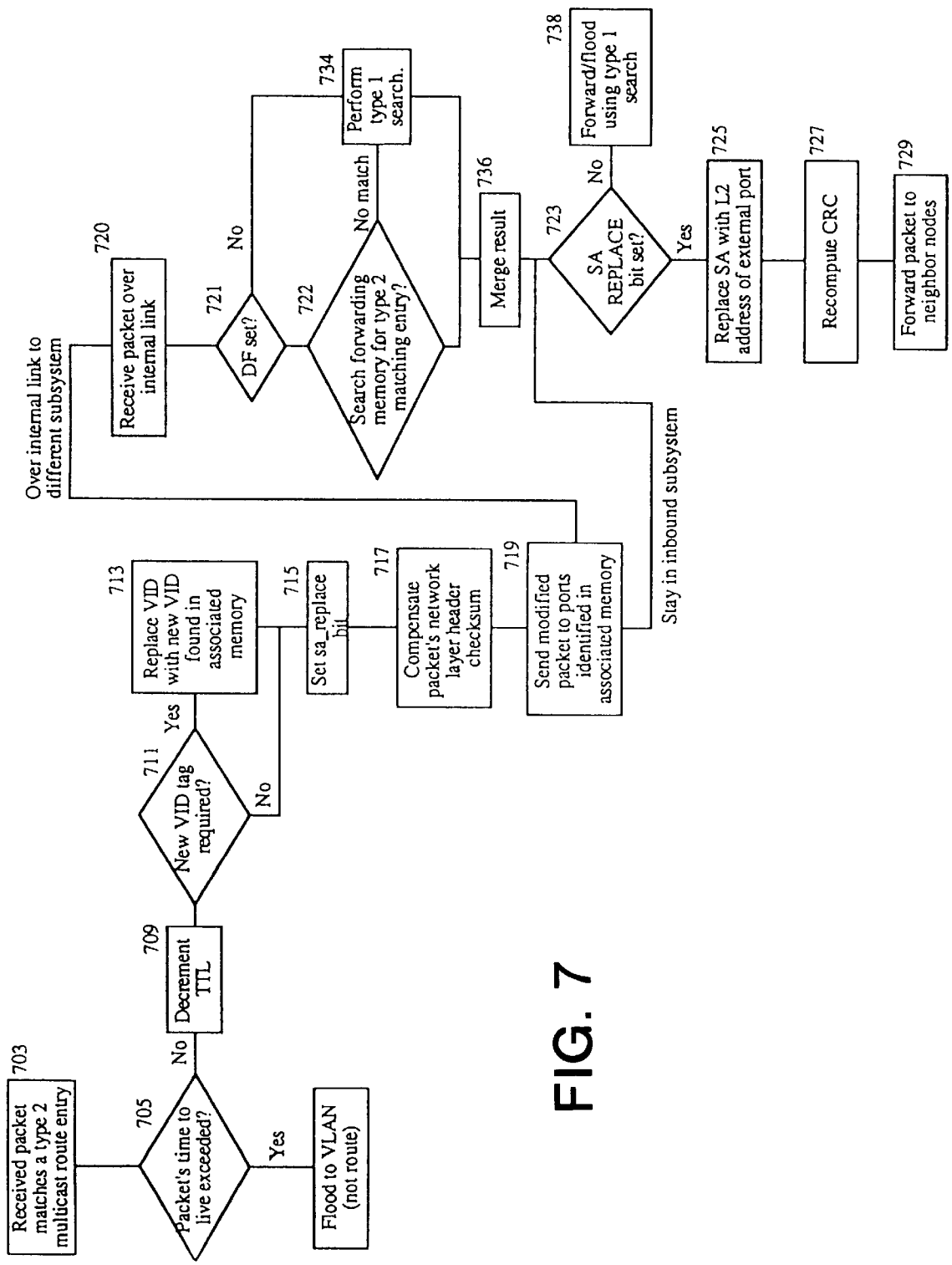
FIG. 7 shows exemplary steps and operations performed by the invention's network element for routing a multicast packet.

Having discussed the unicast routing aspects of the invention, the routing features of the invention for multicast packets are now presented while referring once again to the entries in the forwarding and associated memories of FIG. 3 and the flow diagram of FIG. 7. Although multicast routing in the invention's MLDNE can be supported by similar hardware structures that implement unicast routing in the MLDNE, multicast does present significantly different problems to the network element designer. For instance, the routing protocols used to derive the type 2 entries in the forwarding memory include protocols such as MOSPF and DVMRP which are well-known in the art. These multicast routing protocols produce a loop-free distribution tree for the packet's group destination network layer multicast address and a source network layer address for the sender.

The MLDNE has a local multicast forwarding rule which yields a number of external ports (and their corresponding subsystems) for forwarding the packet, as a function of a received multicast packet group destination Layer 3 address, source Layer 3 address, and the inbound subsystem port of arrival. This dependency is reflected in the type 2 entry in the forwarding memory of FIG. 3 as the fields 327, 325, and 337, respectively, to be matched with a received packet's headers. The inbound port of arrival field 337 is included to prevent forwarding duplicate packets over alternate paths.

To identify a received packet as a candidate for multicast routing, the MLDNE is configured to identify a multicast packet based on at least two criteria. First, the packet headers must match a given class. Second, the packet's headers must match an existing type 2 entry that refers to a multicast group destination address. The matching type 2 entry for the multicast case may be created as a result of executing a multicast registration protocol such as IGMP.

FIG. 7 illustrates an exemplary flow diagram for routing a received multicast packet through the MLDNE 201 of FIG. 4. When a packet is received by the subsystem 410 and the packet headers match a certain class and a type 2 entry 321 which has a multicast route field 355 indicating that the entry is for multicast routing, as in block 703, control is transferred to the decision block 705. If the packet's time to live has not been exceeded, then the routing operation continues in block 709 in the inbound subsystem 410 by decrementing the time to live field in the received packet's header. If the packet's TTL was exceeded, then in block 707 the packet may be flooded, not routed, to its VLAN. A packet's VLAN, in general, defines the Layer 2 topology used for flooding, in other words the broadcast domain.

Proceeding to block 711, the inbound subsystem 410 determines whether a new VLAN tag is required for the received packet, based on the NEW VID tag field 351 in the associated memory. If so, then the VID in the Layer 2 header of the packet is replaced with the destination VID of the next hop, as found in the associated memory, as in block 713. Note that block 713 is performed only if the Layer 3 multicast destination address of the received packet refers to endstations that lie within the same VLAN. Such a determination was made by the CPS when the type 2 entry was created.

Whether or not VLANs are supported by the MLDNE, in block 715 the inbound subsystem 410 prepares to notify the external ports that will forward the packets outside the MLDNE of a need to route the packet by setting the first control signal (sa_replace bit) to indicate to the forwarding external ports that the Layer 2 source address of the packet to be forwarded must be replaced with the source address of the external port. Once the changes have been made to the network layer header, in particular, the portion that includes the time to live (TTL) field, the inbound subsystem compensates the packet's header check sum value in block 717. The inbound subsystem 410 then hands off copies of the packet to the external and internal ports of the inbound subsystem 410 that are identified in the subsystem ports field 347 of the associated memory as corresponding to the matching type 2 entry, as in block 719.

In the case where a copy of the packet traverses an internal link and arrives at a different subsystem 420 in block 720, operation proceeds with decision block 721 where a second control signal, here called the distributed flow (DF or distrib_flow) bit, may be received by the outbound subsystem 420. If the DF bit is set, then a class filter determines the class of the packet, based upon the packet's headers, and a type 2 search (with the identified class) is conducted in block 722.

The distrib_flow construct allows the CPS to define a type 2 entry in the outbound subsystem 420 corresponding to the matching multicast route entry in the inbound subsystem. This allows different priorities to be assigned by the CPS to the different external ports that will service the multicast route, to further control queuing granularity for packets traversing the MLDNE. A force_be bit (placed by the CPS and obtained after a type 2 search in the outbound subsystem) in the associated data of the matching type 2 entry overrides the priority received over the internal link with the packet, such that the packet will be forced to the lowest priority, thus providing some granularity in queuing at the external ports.

If the distrib_flow bit is not set, then a type 1 search is performed on the forwarding memory 423, and the packet is forwarded or flooded accordingly without the type 2 queuing granularity discussed above.

If a matching type 1 or type 2 entry is found, then the packet is handed off to the external ports identified in the associated memory corresponding to the matching entry. Thereafter, operation proceeds with block 723. Thus, a multicast route requires two type 2 entries to be created by the CPS where the inbound and outbound subsystems are different.

The operations from block 723 to block 729 are performed by the outbound subsystem, be it the subsystem 410 or subsystem 420. The outbound subsystem in decision block 723 determines whether the sa_replace bit has been set to indicate that the Layer 2 source address of each copy of the packet should be replaced with the Layer 2 address of the corresponding external port used for forwarding the packet outside the MLDNE. If not, then the packet may be forwarded using a Layer 2 search result.

If there is an indication to replace the Layer 2 source address for routing purposes, then in block 725, the outbound subsystem, in particular an external port of the outbound subsystem, replaces the Layer 2 source address of the packet with a Layer 2 address of the external port. Operation then proceeds with block 727 where a CRC is recomputed for the modified Layer 2 header, and the packet is forwarded in block 729.

Figure 8A:
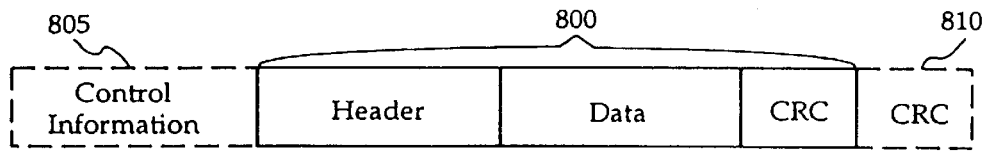
FIG. 8A is a simplified block diagram of a packet structure utilizied in one embodiment of the invention.

An innovative structure and method for transmitting the packet and control information across the internal link will now be described with reference to FIGS. 8A and 8B. FIG. 8A is a simplified diagram of the packet structure utilized. More particularly, as the inbound subsystem has determined certain information regarding the packet, e.g., routing, it is advantageous to simply convey this information to the outbound subsystem so that subsequent processing, such as the header field replacement, can easily be performed without reperforming the same steps performed by the inbound subsystem. Furthermore, it is desirable to maintain end-to-end error robustness. Thus, the inbound subsystem encapsulates the packet 800 with control information 805 and a cycle redundancy code (CRC) 810. The outbound system receives the encapsulated packet, determines frame validity using CRC 810, strips the CRC 810 and removes the control information 805 to determine the subsequent processing to be performed to output the packet.

The control information includes information to instruct the outbound subsystem how to update the header information, if needed, before output. In the present embodiment, the control information includes the following:

replace_sa—when set, indicates that the source address field of the header is to be replace with the outbound subsystem's output MAC address;

orig_tag—when set, indicates that the VLAN tag is the original tag the packet arrived with at the inbound subsystem;

mod_tag—when set, indicates that the VLAN tag the packet arrived with has been modified;

dont_tag—when set, indicates that the VLAN tag may not to be used regardless of the state of the orig-tag and the mod_tag (in the present embodiment, this is typically used when packets arrive from the CPS 260);

distributed_flow—when set, indicates whether a Layer 3 or Layer 2 search should be conducted initially for the packet;

priority (2)—indicates the queuing priority level in the subsystem external ports for the particular packet;

reserved (9)

Figure 8B:
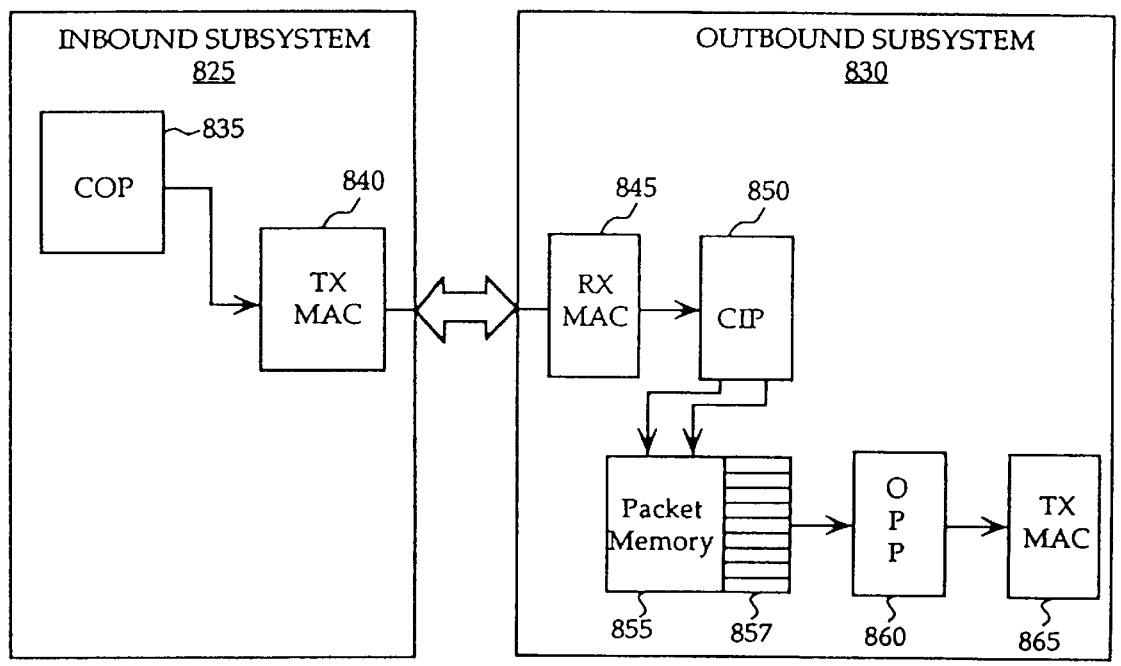
FIG. 8B is a structure for header field replacement of packets by the invention.

A simplified block diagram illustrating the process for header field replacement of packets communicated through internal links is illustrated in the diagram of FIG. 8B. For purposes of explanation, a number of functional elements not relevant to the process of performing header field replacement are not shown or described. However, it is readily apparent to one skilled in the art that the inbound subsystem includes elements to process the received packet prior to transmission to the outbound system and the outbound system includes elements that perform other function in addition to those described herein.

Referring to FIG. 8A, the inbound system 825 receives the packet and accesses the memory containing the database (not shown) to obtain information regarding the packet, e.g., if the packet is to be routed or if VLAN routing is supported. Certain control information is generated and provided to the cascading output process (COP) 835 which prepends the control information to the packet and outputs the packet with the prepended control information to the output interface 840 which generates and appends a CRC to encapsulate the packet for output to the outbound subsystem 830. Preferably the output interface is a media access controller (MAC); however, other interfaces could be used.

The outbound subsystem 830 receives the encapsulated packet at the input interface 845, which is preferably a MAC, performs frame validity checking and strips the CRC. The input interface 845 outputs to the cascading input process (CIP) 850 the packet stripped of the CRC and the CIP 850 removes the control information and forwards the packet, stripped of the encapsulating CRC and control information, to the packet memory 855. The control information is stored in the control field 857 corresponding to the packet stored in the memory 855. The output port process 860 retrieves the packet and the control information from the packet memory 855 and based upon the control information, selectively performs modifications to the packet and issues control signals to the output interface 865 (i.e., MAC).

In one embodiment, which occurs when the packet is to be routed, the OPP 860 strips the last 4 bytes of the packet corresponding to the CRC and asserts control signals to the MAC 865 to append a CRC and replace the source address with its own MAC address. For example, the OPP 860 issues a replace_SA signal and clears a no_CRC bit in a control word sent to the MAC 865. In another embodiment, when VLAN routing is supported, depending upon the state of the control signals, the OPP 860 removes the VLAN tag field in the packet, strips the last 4 bytes of the packet corresponding to the CRC and issues a control signal to the MAC 865 to append a CRC. More particularly, the OPP 860 decodes, orig_tag, mod_tag and dont_tag and a fourth indicator, tag_enable. Tag_enable is an internal variable which indicates that the network segment connected to this output port does not support VLAN tagging. This variable is determined by a network management mechanism based on the underlying network topology. The result of the decoding process indicates whether the OPP 860 is to strip the tag and whether the MAC 865 is to generate a CRC. The OPP decodes according the following table:

| dont_tag | tag_enable | orig_tag | mod_tag | strip_tag | regenerate CRC |
|---|---|---|---|---|---|
| 1 | x | 0 | x | Y | N |
| 1 | x | 1 | x | Y | N |
| 0 | 0 | 0 | x | Y | N |
| 0 | 0 | 1 | x | Y | Y |
| 0 | 1 | 0 | x | N | Y |
| 0 | 1 | 1 | 0 | N | N |
| 0 | 1 | 1 | 1 | N | Y |

Thus if the tag is to be stripped, the OPP 860 removes the tag, preferably as the tag is transferred to the MAC 86. If no CRC is to be generated, the OPP 860 sends a signal indicating that no CRC is to be generated (e.g., set no_CRC) and the MAC 865 transmits the packet as it is received. If the CRC is to be generated, the last 4 bytes are removed from the packet by the OPP 860 a signal to generate the CRC is sent to the MAC 865, (e.g., clear no-CRC).

The MAC 865, based upon the control signals received from the OPP 860, replaces the source address field with its own MAC address and generates a CRC that is appended to the end of the packet as the packet is output.

The encapsulation process can potentially extend the packet by a number of bytes. This can negatively affect the capacity of the link. In order to compensate for this capacity loss and also to allow the reception of frames that may longer than standard protocols define, the protocol parameter (in the present embodiment the Ethernet protocol) are fine tuned to reduce the preamble size by 5 bytes, the interpacket gap by 5 byes and increase the maximum packet size by 10 bytes.

The embodiments of the routing apparatus and methods in the MLDNE 201 described above for exemplary purposes are, of course, subject to other variations in structure and implementation within the capabilities of one reasonably skilled in the art. Thus, the details above should be interpreted as illustrative and not in a limiting sense.

What is claimed is:

1. In a switch comprising a plurality of switch elements, an apparatus for selectively performing header field replacement of packets communicated between two switch elements, comprising:

a cascading output process (COP) located in a first switch element and configured to receive a packet, said packet comprising a header, data and cycle redundancy code (CRC), said COP further configured to receive control information and modify the packet by prepending control information to the packet, said control information providing information regarding a type of the packet, said COP further configured to output the modified packet;

an output interface located in the first switch element, said output interface coupled to receive the modified packet and is configured to selectively generate a CRC to append to the modified packet, said output interface further configured to output the modified packet;

an input interface located in a second switch element and configured to receive the packet output by the output interface of the first switch element, check frame validity of the packet using the appended CRC, and strip the appended CRC from the packet;

a cascading input process (CIP) located in the second switch element and coupled to the input interface, said CIP configured to strip the control information to provide the control information to the second switch element to enable the second switch element to selectively modify the header of the packet in accordance with the control information prior to output from the second switch element.

2. The switch as set forth in claim 1, wherein said CIP is further configured to output the packet and the control information to indicate additional modification of the packet prior to output from the switch;

said second switch element further comprising;

an output port process (OPP) configured to receive the packet and the control information, said OPP configured, in response to said control information, to selectively generate at least one control signal to notify that the packet is to be modified prior to output from the switch and to output a selectively modified packet;

an output interface, said output interface coupled to receive the at least one control signal and the selectively modified packet and is configured to output a packet from the switch that corresponds to the selectively modified input packet, said output interface further configured to selectively modify, in response to the at least one control signal, at least one header field and the CRC of the selectively modified packet prior to transmission of the output packet from the switch.

3. The apparatus as set forth in claim 1, wherein said control information comprises a field to indicate that the source address field of the header is to be replaced prior to output of the modified input packet by the second switch element, said field set when the input packet is to be routed.

4. The apparatus as set forth in claim 2, wherein the control signals selectively indicate generation of a CRC and a replacement of a source address.

5. The apparatus as set forth in claim 2, wherein the output interface of the second switch element is configured to insert the address of the output interface in a source address field of the header in response to the receipt of the at least one control signal indicating replacement of the source address, and to generate a CRC in response to the at least one control signal indicating regeneration of the CRC.

6. The apparatus as set forth in claim 2, wherein the OPP is further configured to strip off the CRC during transmission of the modified input packet to the output interface if the output interface is to generate the CRC.

7. The apparatus as set forth in claim 1, wherein the output interface is a MAC.

8. The apparatus as set forth in claim 2, wherein the at least one control signal comprises a replace_sa signal.

9. The apparatus as set forth in claim 2, wherein the at least one control signal comprises a state of a NO_CRC bit in a control word transmitted to the output interface by the OPP.

10. The apparatus as set forth in claim 1, wherein the switch supports virtual local area networks (VLANs) and the control information comprises an indication of whether the packet is tagged with VLAN information as it arrived in the first switch element, and whether the packet arrived tagged but has been modified and tags are not to be used.

11. The apparatus as set forth in claim 2, wherein said OPP determines whether to strip a VLAN tag field of the packet and send a control signal to the output interface to regenerate and append a CRC according to the following table:

| dont_tag | tag_enable | orig_tag | mod_tag | strip_tag | regenerate CRC |
|---|---|---|---|---|---|
| 1 | x | 0 | x | Y | N |
| 1 | x | 1 | x | Y | N |
| 0 | 0 | 0 | x | Y | N |
| 0 | 0 | 1 | x | Y | Y |
| 0 | 1 | 0 | x | N | Y |
| 0 | 1 | 1 | 0 | N | N |
| 0 | 1 | 1 | 1 | N | Y | wherein tag_enable is a network variable indicative that a network receiving node does not support VLAN routing.

12. The apparatus as set forth in claim 1, wherein the packet further comprises a preamble and interpacket gap which is reduced in size in order to append the CRC and prepend the control information without slowing down data rates.

13. In a switch comprising a plurality of switch elements, a method for selectively performing header field replacement of packets communicated between two switch elements of the plurality of switch elements, comprising:

modifying a packet in a first switch element by prepending control information to the packet, said control information providing information regarding a type of the packet;

generating a cycle redundancy code (CRC) in the first switch element to append to the modified packet to produce an encapsulated packet;

said first element communicating the encapsulated packet to a second switch element;

checking frame validity of the encapsulated packet received at the second switch element;

stripping the appended CRC and the control information from the encapsulated packet;

providing the control information to the second switch element to enable the second switch element to selectively modify a header of the packet in accordance with the control information prior to output from the second switch element.

14. The method as set forth in claim 13, further comprising the steps of:

said second switch element selectively generating at least one control signal to notify that the packet is to be modified prior to output from the switch;

selectively modifying in response to the at least one control signal, at least one header field and a CRC of the packet prior to output from the switch.

15. The method as set forth in claim 13, wherein said control information comprises a field to indicate that the source address field of the header is to be replaced prior to output of the packet from the second switch element, said field set when the packet is to be routed.

16. The method as set forth in claim 14, wherein the control signals selectively indicate generation of a CRC and a replacement of a source address.

17. The method as set forth in claim 14 further comprising the steps of:

inserting an address of the output interface in a source address field of the header in response to receipt of the at least one control signal indicating replacement of the source address; and generating a CRC in response to the at least one control signal indicating regeneration of the CRC.

18. The method as set forth in claim 17, further comprising the step of stripping off the CRC if a CRC is to be generated.

19. The method as set forth in claim 13, wherein the switch supports virtual local area networks (VLANs) and the control information comprises an indication of whether the packet is tagged as it arrived, whether the packet arrived tagged but has been modified and tags are not to be used.

20. The apparatus as set forth in claim 19, further comprising the step of determining whether to strip a VLAN tag and regenerate and append a CRC to the packet according to the following table:

| dont_tag | tag_enable | orig_tag | mod_tag | strip_tag | regenerate CRC |
|---|---|---|---|---|---|
| 1 | x | 0 | x | Y | N |
| 1 | x | 1 | x | Y | N |
| 0 | 0 | 0 | x | Y | N |
| 0 | 0 | 1 | x | Y | Y |
| 0 | 1 | 0 | x | N | Y |
| 0 | 1 | 1 | 0 | N | N |
| 0 | 1 | 1 | 1 | N | Y | wherein tag_enable is a network variable indicative that a receiving node does not support VLAN routing.

21. The method as set forth in claim 13, wherein the packet further comprises a preamble and interpacket gap, said method further comprising the step of reducing the packet in size by reducing a size of the preamble and interpacket gap.

* * * * *